United States Patent
Kojima et al.

(10) Patent No.: US 8,416,962 B2
(45) Date of Patent: Apr. 9, 2013

(54) AUDIO MIXING/REPRODUCING DEVICE

(75) Inventors: Shinji Kojima, Osaka (JP); Ichiro Kawashima, Osaka (JP); Naoki Shindou, Osaka (JP); Yoshiaki Sawada, Osaka (JP); Kosuke Nishio, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/746,061

(22) PCT Filed: Dec. 15, 2008

(86) PCT No.: PCT/JP2008/003765
§ 371 (c)(1),
(2), (4) Date: Jun. 3, 2010

(87) PCT Pub. No.: WO2009/084165
PCT Pub. Date: Jul. 9, 2009

(65) Prior Publication Data
US 2010/0254548 A1   Oct. 7, 2010

(30) Foreign Application Priority Data
Dec. 28, 2007   (JP) .................................. 2007-339340

(51) Int. Cl.
*H04B 3/00*   (2006.01)
*G06F 17/00*  (2006.01)

(52) U.S. Cl.
USPC ............................................. 381/77; 700/94

(58) Field of Classification Search .................... 381/22, 381/23, 119, 77, 30, 35; 386/52, 125; 700/94
See application file for complete search history.

(56) References Cited

U.S. PATENT DOCUMENTS

| | | | |
|---|---|---|---|
| 5,517,652 A | 5/1996 | Miyamoto et al. | |
| 6,683,911 B1 | 1/2004 | Inoue | |
| 6,744,969 B1 * | 6/2004 | Kamiyama et al. | 386/278 |
| 7,054,820 B2 | 5/2006 | Potekhin et al. | |
| 7,873,264 B2 * | 1/2011 | Yahata et al. | 386/281 |
| 2003/0194221 A1 * | 10/2003 | Cookson et al. | 386/95 |
| 2007/0286289 A1 | 12/2007 | Arai et al. | |
| 2009/0208188 A1 * | 8/2009 | Yahata et al. | 386/98 |

FOREIGN PATENT DOCUMENTS

| | | |
|---|---|---|
| JP | 04-356844 | 12/1992 |
| JP | 2000-165802 | 6/2000 |
| JP | 2007-300593 | 11/2007 |
| WO | WO 03/098598 A1 | 11/2003 |

\* cited by examiner

*Primary Examiner* — Fan Tsang
*Assistant Examiner* — Eugene Zhao
(74) *Attorney, Agent, or Firm* — McDermott Will & Emery LLP

(57) ABSTRACT

An audio mixing/reproducing device includes an audio decoder (11) configured to decode an encoded audio input signal, an audio mixer (13) configured to mix an audio signal output from the audio decoder (11) with a non-encoded external audio input signal, and an audio encoder (12) configured to encode an audio signal output from the audio mixer (13) to generate an encoded audio output signal, and in addition, a switch (14) configured to generate a switch signal for controlling operations of each of the audio decoder (11) and the audio encoder (12) in response to a switch activation signal. The audio decoder (11) and the audio encoder (12) each support a plurality of encoding schemes, and the switch (14), when switching the encoding scheme of the audio decoder (11) from a first encoding scheme to a second encoding scheme, controls the audio decoder (11) and the audio encoder (12) so that the encoding scheme of the audio encoder (12) is switched from the first encoding scheme to the second encoding scheme as in the audio decoder (11).

7 Claims, 4 Drawing Sheets

AUDIO MIXING/REPRODUCING DEVICE

RELATED APPLICATIONS

This application is the U.S. National Phase under 35 U.S.C. §371 of International Application No. PCT/JP2008/003765, filed on Dec. 15, 2008, which in turn claims the benefit of Japanese Application No. 2007-339340, filed on Dec. 28, 2007, the disclosures of which Applications are incorporated by reference herein.

TECHNICAL FIELD

The present invention relates to the technical field of real-time mixing and reproduction of two or more audio signals.

BACKGROUND ART

For editing apparatuses which link one encoded stream to some midpoint of another encoded stream, these streams being recorded on, for example, a digital versatile disk (DVD)—random access memory (RAM), to produce a single encoded stream, there is a known technique of decoding first and second streams using two decoders and selecting decoded data to perform reencoding only for a short period of time including periods of time before and after an editing point, and selecting streams as they are before editing for the other period of time so that one stream can be linked to any point of another stream while a degradation in image quality is reduced or prevented. In this case, only the audio of the first stream can be replaced with the audio of the second stream while the image of the first stream is not replaced with the image of the second stream (see PATENT DOCUMENT 1).
Citation List
Patent Document
PATENT DOCUMENT 1: Japanese Patent Laid-Open Publication No. 2000-165802

SUMMARY OF THE INVENTION

Technical Problem

However, in the aforementioned conventional technique, two or more audio signals cannot be mixed or reproduced in real time. The aforementioned conventional technique is also not flexible or adaptable to various encoding techniques (encoding standards).

It is an object of the present invention to provide an audio mixing/reproducing device which can mix and reproduce two or more audio signals in real time while supporting a plurality of encoding schemes.
Solution to the Problem To achieve the aforementioned object, the present invention employs a structure of an audio mixing/reproducing device including an audio decoding unit configured to decode an encoded audio input signal to generate a first audio signal, an audio mixing unit configured to mix the first audio signal with a non-encoded second audio signal to generate a third audio signal, an audio encoding unit configured to encode the third audio signal to generate an encoded audio output signal, and a switching unit configured to switch between operations of each of the audio decoding unit and the audio encoding unit. The audio decoding unit and the audio encoding unit each support two or more encoding schemes, and the switching unit, when switching the encoding scheme of the audio decoding unit from a first encoding scheme to a second encoding scheme, controls the audio decoding unit and the audio encoding unit so that the encoding scheme of the audio encoding unit is switched from the first encoding scheme to the second encoding scheme in synchronization with the switching of the encoding schemes in the audio decoding unit.
Advantages of the Invention According to the present invention, while two or more encoding schemes are supported, an encoded audio signal which is obtained by mixing with a non-encoded second audio signal (e.g., an external audio signal) can be output in real time using the same encoding scheme as that of the input. Therefore, a signal which is obtained by mixing an encoded audio signal which is, for example, read out from a medium with an external audio signal can be immediately written back into the medium.

DESCRIPTION OF REFERENCE CHARACTERS

11 Audio Decoder
12 Audio Encoder
13 Audio Mixer
14 Switch
15 Switch Time Adjuster
16 Control Determiner
17 External Audio Input Switch
18 Audio Output Switch
19 Audio Determiner
21 Image Decoder
22 Image Determiner
23 Sound Level Adjuster
24 Audio Output Switch
121, 122 Audio Encoder

DESCRIPTION OF EMBODIMENTS

Embodiments of the present invention will be described in detail hereinafter with reference to the accompanying drawings. Although first and second encoding schemes described below are, for example, of the MPEG audio layer-3 (MP3) standard and the advanced audio coding (AAC) standard, the present invention is not limited to those specific encoding schemes.

<<First Embodiment>>

Figure 1:
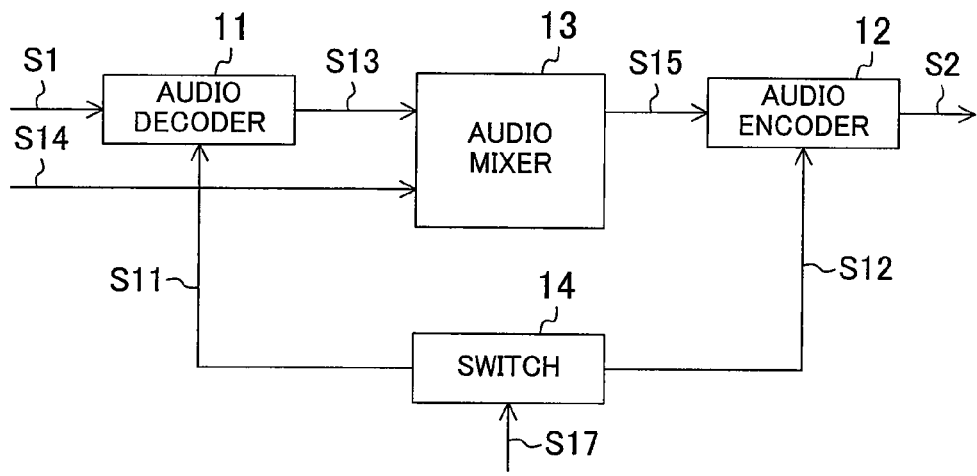
FIG. 1 is a block diagram of an audio mixing/reproducing device according to a first embodiment of the present invention.

FIG. 1 is a block diagram of a device according to a first embodiment of the present invention. In FIG. 1, the reference character 11 indicates an audio decoder which supports a first encoding scheme and a second encoding scheme, the reference character 12 indicates an audio encoder which supports the first and second encoding schemes, the reference character 13 indicates an two-input audio mixer, and the reference character 14 indicates a switch. The reference character S1 indicates an encoded audio input signal, and the reference character S2 indicates an encoded audio output signal. The reference character S11 indicates a switch signal which is generated by the switch 14 and is used to switch between the encoding schemes of the audio decoder 11. The reference character S12 indicates a switch signal which is generated by the switch 14 and is used to switch between the encoding schemes of the audio encoder 12. The reference character S13 indicates an audio signal which is output by the audio decoder 11, the reference character S14 indicates a non-encoded external audio input signal, the reference character S15 indicates an audio signal which is a mixture of the decoded audio signal S13 and the external audio input signal S14, and the reference character S17 indicates an encoding scheme switch activation signal which is externally input to the switch 14. Encoding scheme switch activation is written in, for example, a video object (VOB) management area of DVDs, and can be detected by an external system, although the process of generating the encoding scheme switch activation is not specified in this embodiment.

In the audio mixing/reproducing device of FIG. 1, the two switch signals S11 and S12 are synchronously generated in accordance with the switch activation signal S17, whereby the encoding schemes of the audio decoder 11 and the audio encoder 12 are simultaneously switched to the same scheme. The decoded audio signal S13 is mixed with the external audio input signal S14 by the audio mixer 13 before being encoded by the audio encoder 12 using the same encoding scheme with which the decoded audio signal S13 was originally encoded.

Therefore, two or more encoding schemes can be supported, and an encoded audio signal mixed with external audio can be generated using the same encoding scheme as that of the input.

<<Second Embodiment>>

Figure 2:
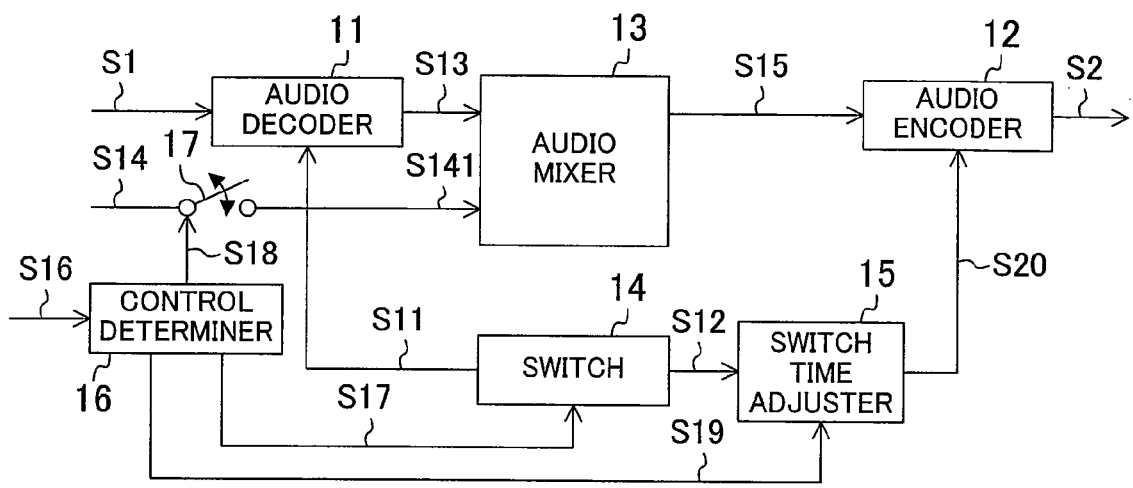
FIG. 2 is a block diagram of an audio mixing/reproducing device according to a second embodiment of the present invention.

FIG. 2 is a block diagram of a device according to a second embodiment of the present invention. In FIG. 2, the reference character 15 indicates a switch time adjuster, the reference character 16 indicates a control determiner, and the reference character 17 indicates an external audio input switch.

The control determiner 16 receives a user control signal S16 indicating a user's instruction and determines a control, and outputs an encoding scheme switch activation signal S17, a select control signal S18, and an encoding scheme switch permission signal S19 to the switch 14, the external audio input switch 17, and the switch time adjuster 15, respectively. The external audio input switch 17 switches between the active mode and the inactive mode of the external audio input signal S14 based on the select control signal S18 from the control determiner 16. The reference character S141 indicates a signal which is input as a second input signal to the audio mixer 13 based on the active-mode external audio input signal S14. The switch 14 outputs two switch signals S11 and S12 to an audio decoder 11 and an audio encoder 12, respectively, based on the switch activation signal S17 from the control determiner 16 to specify an encoding scheme for the audio decoder 11 and the audio encoder 12. The switch time adjuster 15 adjusts the timing of transmission of the encoding scheme to the audio encoder 12 based on the switch permission signal S19 from the control determiner 16. The reference character S20 indicates a switch signal whose timing has been adjusted.

In the audio mixing/reproducing device of FIG. 2, the control determiner 16 receives the user control signal S16 and then transmits the switch activation signal S17 before the two switch signals S11 and S12 are synchronously generated. The control determiner 16 also transmits the select control signal S18 and the switch permission signal S19 to the external audio input switch 17 and the switch time adjuster 15, respectively. As is different from the first embodiment, the switch signal S12 is not directly transmitted to the audio encoder 12. Instead, the switch signal S12 is held by the switch time adjuster 15, and after the switch time adjuster 15 receives the switch permission signal S19, is transmitted as the timing-adjusted switch signal S20 to the audio encoder 12. Here, the control determiner 16 is controlled so that the timings of transmission of the select control signal S18 and the switch permission signal S19 are dependent on each other, thereby preventing the output of the audio encoder 12 from being unnatural. For example, the switch permission signal S19 is transmitted to switch between the encoding schemes of the audio encoder 12 before the select control signal S18 is transmitted. Alternatively, when the external audio input signal S14 is in the active mode in accordance with the select control signal S18, the switch permission signal S19 is not transmitted, and after the external audio input signal S14 stops, the switch permission signal S19 is transmitted. By such a method, the control determiner 16 can be controlled so that the external audio input signal S14 does not overlap a period of time during which no sound is present when switching of the encoding schemes is performed.

While, in the aforementioned example, a method has been described which reduces or prevents interruption of audio of the external audio input signal S14 by controlling the timings of the select control signal S18 and the switch permission signal S19, the process is not limited by this embodiment.

<<Third Embodiment>>

Figure 3:
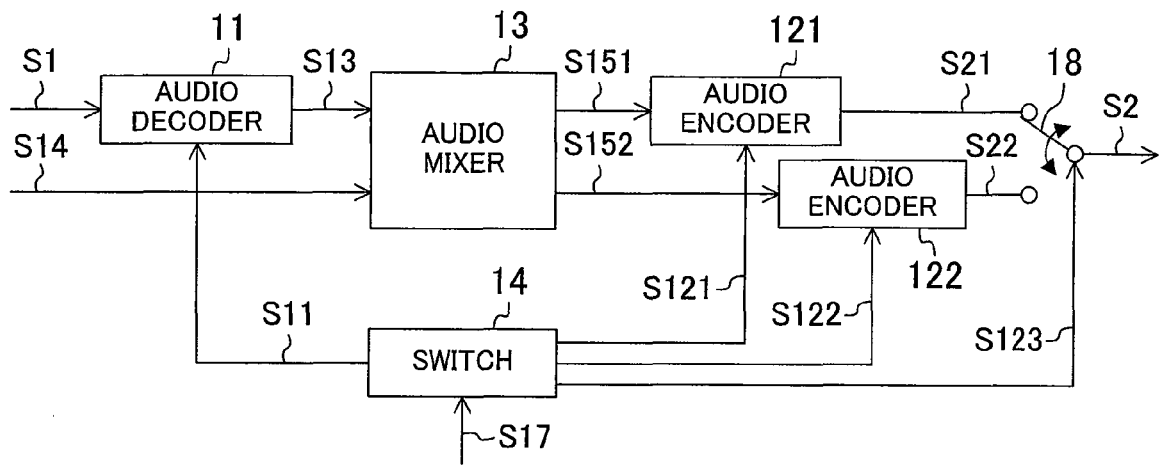
FIG. 3 is a block diagram of an audio mixing/reproducing device according to a third embodiment of the present invention.

FIG. 3 is a block diagram of a device according to a third embodiment of the present invention. In FIG. 3, the reference character 121 indicates a first audio encoder which supports a first encoding scheme, the reference character 122 indicates a second audio encoder which supports a second encoding scheme, and the reference character 18 indicates an audio output switch. The reference character S121 indicates a control signal which is generated by the switch 14 and is used to activate the first audio encoder 121, the reference character S122 indicates a control signal which is generated by the switch 14 and is used to activate the second audio encoder 122, and the reference character S123 indicates a select control signal which is generated by the switch 14 and is output to the audio output switch 18. The reference character S151 indicates an audio signal which is a mixture of the decoded audio signal S13 and the external audio input signal S14 and is transmitted to the first audio encoder 121, the reference character S152 indicates an audio signal which is a mixture of the decoded audio signal S13 and the external audio input signal S14 and is transmitted to the second audio encoder 122, the reference character S21 indicates an audio output signal which is obtained by encoding the audio signal S151 using the first encoding scheme, and the reference character S22 indicates an audio output signal which is obtained by encoding the audio signal S152 using a second encoding scheme. The audio output switch 18 selects one of the two encoded audio output signals S21 and S22 in accordance with the select control signal S123.

In the audio mixing/reproducing device of FIG. 3, initially, the switch 14 generates the control signals S121 and S122. Next, when it is necessary to switch between the encoding schemes, a decoding switch signal 511 and the select control signal S123 are synchronously generated. On the other hand, the encoded audio output signals S21 and S22 are obtained by encoding the same audio signals S151 and S152, respectively, using different encoding schemes. Therefore, when the encoding scheme of the audio decoder 11 is switched to the other, the encoding scheme of the final output can be switched from the first scheme to the second scheme, or from the second scheme to the first scheme, without a time delay.

<<Fourth Embodiment>>

Figure 4:
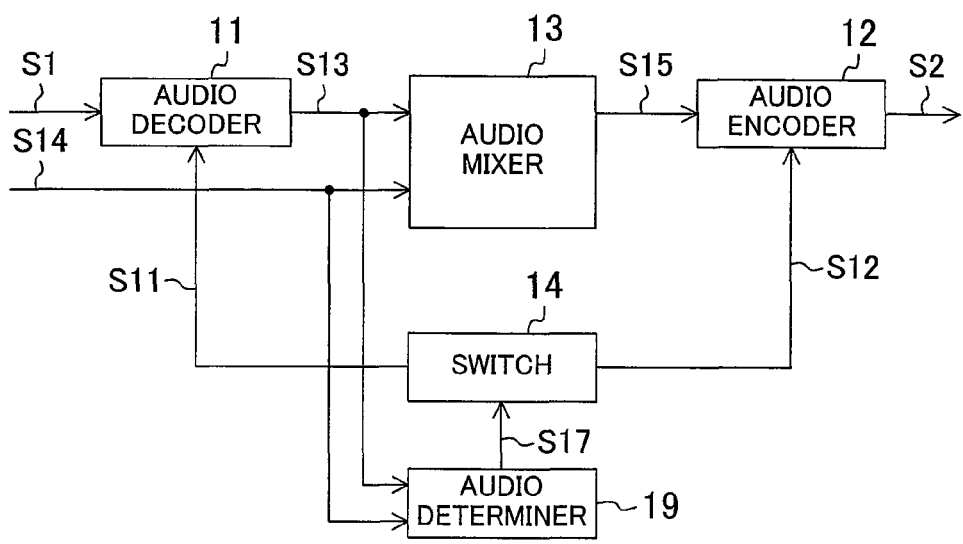
FIG. 4 is a block diagram of an audio mixing/reproducing device according to a fourth embodiment of the present invention.

FIG. 4 is a block diagram of a device according to a fourth embodiment of the present invention. In FIG. 4, the reference character 19 indicates an audio determiner which determines sound levels of a decoded audio signal S13 and an external audio input signal S14.

In general, when the encoding scheme of an encoded audio input signal S1 is switched to another, the sound level of the decoded audio signal S13 which is the result of decoding of the encoded audio input signal S1, or the sound level of the external audio input signal S14 tends to be sufficiently reduced.

Therefore, in the audio mixing/reproducing device of FIG. 4, the audio determiner 19 measures the sound level of each of the decoded audio signal S13 and the external audio input signal S14 in predetermined intervals to calculate an accumulated value in each interval. When the accumulated value of the decoded audio signal S13 or the external audio input signal S14 is sufficiently small, the audio determiner 19 determines that it is time to switch the encoding scheme of the encoded audio input signal S1 to another, and outputs an encoding scheme switch activation signal S17 to a switch 14.

While it has been assumed above that the sound levels of both the decoded audio signal S13 and the external audio input signal S14 are determined, the sound level of only one of the decoded audio signal S13 and the external audio input signal S14 may be determined.

<<Fifth Embodiment>>

Figure 5:
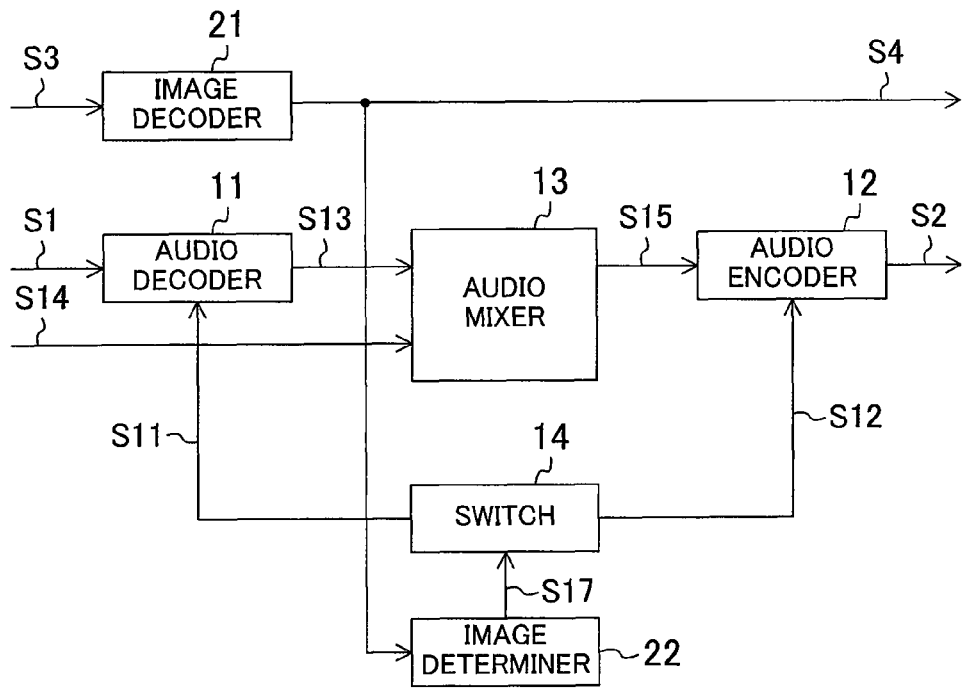
FIG. 5 is a block diagram of an audio mixing/reproducing device according to a fifth embodiment of the present invention.

FIG. 5 is a block diagram of a device according to a fifth embodiment of the present invention. In FIG. 5, the reference character 21 indicates an image decoder, and the reference character 22 indicates an image determiner. The reference character S3 indicates an encoded image input signal, and the reference character S4 indicates a decoded image signal.

In general, when the encoding scheme of an encoded audio input signal S1 from, for example, a DVD is switched to another, the image signal S4 which is an output of the image decoder 21 tends to contain no motion, i.e., tends to be a still image.

Therefore, in the audio mixing/reproducing device of FIG. 5, the image determiner 22 measures an image motion amount in the image signal S4 in predetermined intervals to calculate an accumulated value in each interval. When the accumulated value is sufficiently small, the image determiner 22 determines that it is time to switch the encoding scheme of the encoded audio input signal S1 to another, and outputs an encoding scheme switch activation signal S17 to a switch 14.

<<Sixth Embodiment>>

Figure 6:
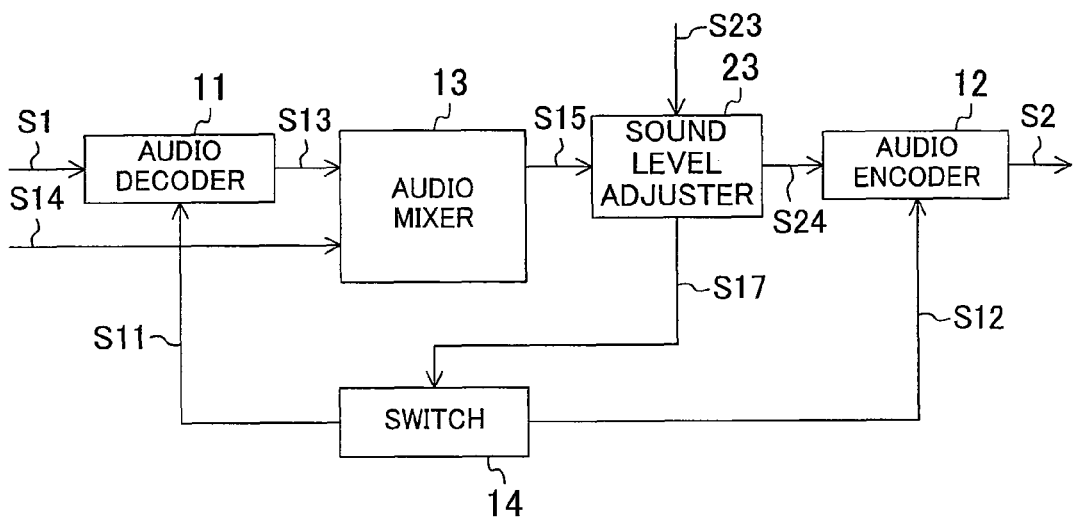
FIG. 6 is a block diagram of an audio mixing/reproducing device according to a sixth embodiment of the present invention.

FIG. 6 is a block diagram of a device according to a sixth embodiment of the present invention. In FIG. 6, the reference character 23 indicates a sound level adjuster which reduces a sound level at the instant that one encoding scheme is switched to another. The reference character S23 indicates a fade-out instruction signal which is externally input to the sound level adjuster 23, and the reference character S24 indicates an audio signal whose sound level has been adjusted.

In the audio mixing/reproducing device of FIG. 6, the sound level adjuster 23 starts a fade-out process in accordance with the fade-out instruction signal S23. At the same time when the fade-out process of the sound level adjuster 23 is completed, the sound level adjuster 23 outputs an encoding scheme switch activation signal S17 to the switch 14. As a result, two switch signals S11 and S12 are synchronously generated, whereby the encoding schemes of an audio decoder 11 and an audio encoder 12 are switched to the same scheme. At the same time when the encoding scheme switching occurs, the sound level adjuster 23 starts a fade-in process.

Therefore, it is possible to conceal discontinuation which occurs at the instant that one encoding scheme is switched to another. Moreover, by performing a fade-in process immediately after switching in the audio encoder 12 rather than upon switching in the audio decoder 11, a period of time during which the output of the external audio input signal S14 is interrupted can be minimized.

<<Seventh Embodiment>>

Figure 7:
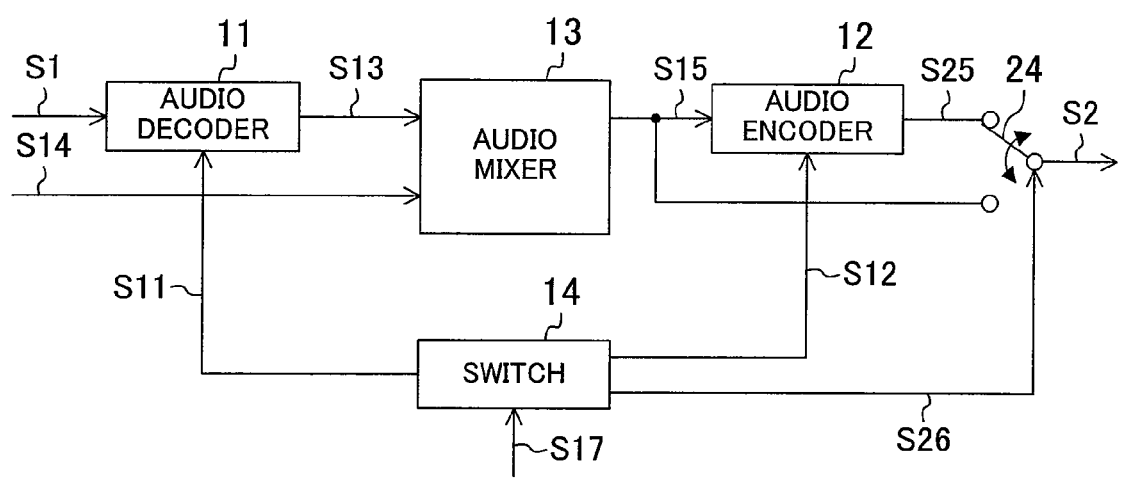
FIG. 7 is a block diagram of an audio mixing/reproducing device according to a seventh embodiment of the present invention.

FIG. 7 is a block diagram of a device according to a seventh embodiment of the present invention. In FIG. 7, the reference character 24 indicates an audio output switch which outputs a mixture audio signal S15 which has not been encoded, without modification, only for a period of time during which one encoding scheme is switched to another. The reference character S25 indicates an encoded audio signal, and the reference character S26 indicates a select control signal which is input to the audio output switch 24.

In the audio mixing/reproducing device of FIG. 7, two switch signals S11 and S12 are synchronously generated in accordance with an encoding scheme switch activation signal S17, whereby the encoding schemes of an audio decoder 11 and an audio encoder 12 are simultaneously switched to the same scheme. Note that the mixture audio signal S15 is output without being encoded for a period of time during which the encoding scheme of the audio encoder 12 is switched to another. At the same time when the encoding scheme switching is completed in the audio encoder 12, the audio output switch 24 is switched to the original audio encoder 12 to output the encoded audio signal S25.

Therefore, when the period of time during which the encoding scheme of the audio encoder 12 is switched to another is long, by temporarily outputting the audio signal S15 which has not been encoded, it is possible to avoid a silent state.

INDUSTRIAL APPLICABILITY

As described above, the audio mixing/reproducing device of the present invention can output an encoded audio signal which is obtained by mixing with an external audio signal using the same encoding scheme as that of an input. Therefore, the audio mixing/reproducing device of the present invention is useful for real-time mixing and reproduction of an audio signal.

The invention claimed is:

1. An audio mixing/reproducing device comprising:
   an audio decoding unit configured to decode an encoded audio input signal to generate a first audio signal;
   an audio mixing unit configured to mix the first audio signal with a non-encoded second audio signal to generate a third audio signal;
   an audio encoding unit configured to encode the third audio signal to generate an encoded audio output signal; and a switching unit configured to switch between operations of each of the audio decoding unit and the audio encoding unit, wherein the audio decoding unit and the audio encoding unit each support two or more encoding schemes, and the switching unit, when switching the encoding scheme of the audio decoding unit from a first encoding scheme to a second encoding scheme, controls the audio decoding unit and the audio encoding unit so that the encoding scheme of the audio encoding unit is switched from the first encoding scheme to the second encoding scheme in synchronization with the switching of the encoding schemes in the audio decoding unit.

2. The audio mixing/reproducing device of claim 1, further comprising:

a control determining unit configured to receive a user's instruction to determine a control;

a signal selecting unit configured to switch between an active mode and an inactive mode of the second audio signal based on a select control signal from the control determining unit; and a switch time adjusting unit configured to adjust a timing of transmission of an encoding scheme to the audio encoding unit based on a switch permission signal from the control determining unit, wherein the switching unit specifies an encoding scheme to the audio decoding unit and the audio encoding unit based on a switch activation signal from the control determining unit.

3. The audio mixing/reproducing device of claim 1, wherein the audio encoding unit includes a first audio encoder configured to encode the third audio signal to generate a first encoded audio output signal, a second audio encoder configured to encode the third audio signal using an encoding scheme different from that for the first encoded audio output signal to generate a second encoded audio output signal, and an audio output switch configured to select one of the first and second encoded audio output signals as the encoded audio output signal, and the switching unit, when selecting one of the first and second encoded audio output signals, activates both of the first and second audio encoders.

4. The audio mixing/reproducing device of claim 1, further comprising:

an audio determining unit configured to determine a sound level of at least one of the first and second audio signals, wherein the switching unit is controlled by the audio determining unit.

5. The audio mixing/reproducing device of claim 1, further comprising:

an image decoding unit configured to decode an encoded image input signal to generate an image signal; and an image determining unit configured to determine the image signal, wherein the switching unit is controlled by the image determining unit.

6. The audio mixing/reproducing device of claim 1, further comprising:

a sound level adjusting unit coupled between the audio mixing unit and the audio encoding unit, wherein at the instant that the audio encoder switches between the encoding schemes, a sound level is lowered by the audio adjusting unit.

7. The audio mixing/reproducing device of claim 1, further comprising:

an audio selecting unit coupled to an output of the audio encoding unit, wherein the audio selecting unit outputs the third audio signal without modification for a period of time during which the audio encoding unit switches between the encoding schemes.

* * * * *